Patented June 26, 1951

2,558,480

UNITED STATES PATENT OFFICE 2,558,480

WATER-SOLUBLE THYMINE COMPOUNDS

Karl Dittmer, Irving Goodman, and Donald Visser, Boulder, Colo., assignors to The Chemical Foundation, Inc., New York, N. Y., a corporation of New York No Drawing. Application April 8, 1947, Serial No. 740,260

4 Claims. (Cl. 260—211.5)

This invention relates to biologically active water soluble thymine compounds, more particularly to the synthesis of hexoso and pentoso thymines and their use as specific food factors.

While it is known that thymine is necessary for the growth of certain bacteria, namely, the Lactobacilli, the fact that it is poorly water soluble naturally imposes marked limitations on its biological usefulness.

As is known, thymine was discovered by Kossel and Newman in 1893 and was successfully synthesized in 1901. This compound has since been synthesized by several methods. The compound has recently assumed marked importance due to the report by Spies (Southern Medical Journal 39, 269–270, 1946) of its beneficial effect in the treatment of pernicious anemia. This investigator reported that the dosage required is several thousand times that of folic acid when the latter is used for treating the disease. Thus, thymine can be substituted for folic acid in the treatment of the disease but the dose required is inordinately high. Similarly, it has been reported that thymine (Keatha et al., Jour. Biol. Chem. 158, 145–156, 1945) may be substituted for folic acid (L. casei factor) in influencing the growth of S. lactis R. In the same report there was shown to be a further substitution of thymine for folic acid in the support of the growth of L. casei organisms.

In the above reports thymine (2,6-dioxy-5-methyl pyrimidine; 5 methyl uracil) was used but it is to be noted that, as such, the compound is poorly water soluble rendering it difficult in its assimilation by the organism. Thymine is a crystalline powder, made up of short white crystals, melting with decomposition at 320° C., is very slightly soluble in ether and difficultly soluble in water and alcohol. The potassium, sodium, silver, mercury and lead salts of the compound are likewise sparingly water soluble. Thus, to date, the solubility of thymine has been a problem with reference to its use in biological systems.

It has now been found that highly water soluble thymine compounds may be produced which present marked biological activity.

In the course of intensive investigation in this field it has been ascertained that thymine may be coupled with certain sugars to produce a readily water soluble compound of enhanced biological activity. It has been determined specifically, for example, that 3-glucosido thymine exerts a high biologic activity for L. casei whereas its molecular equivalent of thymine exerts but a low degree of activity. Furthermore, 3-glucosido thymine exerts a beneficial effect on sulfaguanidine induced macrocytic anemias in rats, whereas thymine alone is less effective.

Schmidt, Nickels and Johnson, although not seeking glucosido thymine, endeavored to synthesize 3-methyl thymine (J. A. C. S. 52, 4511, 1930) from brom-aceto-glucose and 2,6 diethoxy thymine which resulted in a product having a melting point of 316° C. The yield was too small for analysis. Generally the synthesis carried out by Schmidt, Nickels and Johnson consisted of heating a mixture of 2 gms. of 2,6-dimethoxy-5 methylpyrimidine and 2 gms. of bromoacetoglucose. The resulting product was extracted with 5 ml. of water and the small portion which did not dissolve was presumed to be 3-methyl thymine. Using the principle suggested by the above investigators the experiment was repeated with bromo aceto chloroaceto glucose, pyrimidine and 2,6 diethoxy-5-methylpyrimidine. However, our attempt to reproduce these results with larger quantities of material yielded a compound having a melting point of 326° C. which was identified as thymine.

The procedure we therefore had to employ for the preparation of 3 glucosido thymine was based in part on a principle developed by Hilbert and Johnson (J. A. C. S. 52, 4489, 1930) in their preparation of glucosido uracil. Their investigation demonstrated the possibility of applying a method of alkylation which enabled one to control a substitution in the 3-position of the pyrimidine ring. This involved a reaction between 2,6 dialkoxy-pyrimidine and an alkyl halide which interact in accordance with the equation:

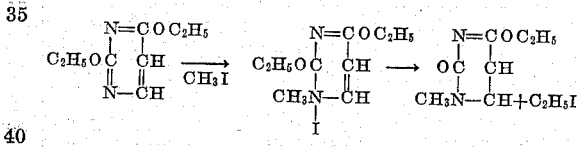

They reported an analogous reaction between 2,6 dimethoxy pyrimidine and acetobromoglucose yielding 2-oxy-6-methoxy-3 tetra-acetylglucosido pyrimidine. The resultant 2-oxy-3-methyl-6-methoxy pyrimidine (liberated by the presence of methyl bromide reacting with 2,6 dimethoxy pyrimidine) and the acetylated glucosido (2-oxy-6-methoxy-3-tetra acetylglucosido-pyrimidine) are separated and the latter de-ethylated and de-acetylated on treatment with alcoholic hydrochloric acid yielding 3-glucosido uracil.

Utilizing this principle, but substituting thymine for uracil, modifications involving these previous methods were employed. Because of the tendency of diethoxy thymine to react with ethyl bromide, which is split off from the quaternary complex of diethoxy thymine and brom-aceto glucose, a vacuum of 2-3 mm. Hg was used. Furthermore, to neutralize traces of acid present, a few drops of pyridine were added to the reaction mixture. The reaction was carried out at 50° C. for 10 days at 2-3 mm. Hg. During the first 3 days of reaction considerable amounts of $C_2H_5Br$ were given off as evidenced by bubbling in the reaction mixture and by analysis of the liquor accumulated in the solid $CO_2$ acetone trap. The addition of an equal volume of ether and cooling in a refrigerator for two months failed to produce any crystals of the desired product which per contra occurred in the case of diethoxy uracil and bromoaceto-glucose. Other standard methods for obtaining crystals likewise failed.

If after hydrolysis of the reaction mixture with HCl in absolute methanol both $CH_3OH$ and $CH_3COOH$ are removed under reduced pressure and absolute ethanol and ether introduced pure white crystals formed, which on analysis, were revealed to be 3 glucosido thymine. Furthermore, 3-glucosido thymine can be recrystallized from 90% ethanol. The reaction can be expressed as follows:

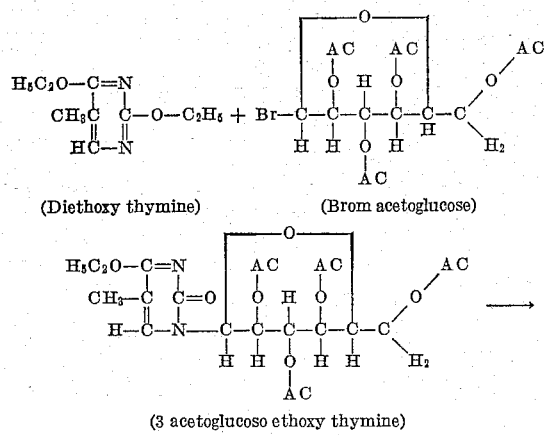

(3 acetoglucoso ethoxy thymine)

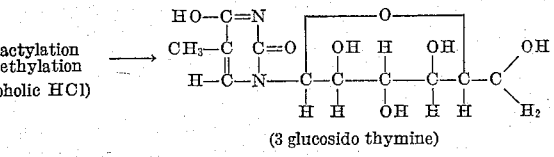

(3 glucosido thymine)

The melting point of the final product is 263-266° C. (uncorrected), the solubility corresponds roughly to that of 3 glucosido uracil; N (found) = 9.53%; N (theory) =9.72%.

Corresponding 3 saccharido thymines were prepared with d-galactose, and d-arabinose by similar methods where substitution in the 3-position corresponded to process involving acetoglucose. The biologic activity of these latter complexes of thymine are as yet undetermined.

It will be appreciated that the availability of a water soluble thymine compound presents many advantages. The product may be dissolved in physiological salt solutions and thus be made available for parenteral use. Similarly, the product may be prepared in any suitable form for oral administration by incorporating it in pills and the like, either alone or in association with other valuable therapeutic agents. As pointed out previously, the new water soluble thymine compounds are particularly useful as adjuvants in culture media where bacteria specifically require such a factor for their growth.

We claim:

1. A method of producing a water soluble thymine compound which comprises reacting 2,6-diethoxy-thymine with a halogenated aceto-aldose under vacuum and in the presence of pyridine to produce 3-aceto-aldoso-6-ethoxy thymine, then hydrolyzing such product under vacuum with alcoholic hydrochloric acid to de-acetylate and de-ethylate the intermediate product and recovering a water soluble 3-aldosido thymine.

2. A method of producing a water soluble thymine compound which comprises, reacting 2,6-diethoxy-thymine with acetobromoglucose under vacuum and in the presence of pyridine to produce 3-acetoglucose-6-ethoxy thymine, then hydrolyzing such product under vacuum with alcoholic hydrochloric acid to de-acetylate and de-ethylate the intermediate product and recovering a water soluble 3-glucosido thymine.

3. A method of producing a water soluble thymine compound which comprises, reacting 2,6-diethoxy thymine with acetobromo galactose under vacuum and in the presence of pyridine to produce 3-acetogalactose-6-ethoxy thymine, then hydrolyzing such product under vacuum with alcoholic hydrochloric acid to de-acetylate and de-ethylate the intermediate product and recovering water soluble 3-galactosido thymine.

4. A method of producing a water soluble thymine compound which comprises, reacting 2,6-diethoxy thymine with acetobromo arabinose under vacuum and in the presence of pyridine to produce 3-acetoarabinose-6-ethoxy thymine, then hydrolyzing such product under vacuum with alcoholic hydrochloric acid to de-acetylate and de-ethylate the intermediate product and recovering water soluble 3-arabinosido thymine.

KARL DITTMER.
IRVING GOODMAN.
DONALD VISSER.

REFERENCES CITED

The following references are of record in the file of this patent:

UNITED STATES PATENTS

| Number | Name | Date |
|---|---|---|
| 2,134,463 | Taylor et al. | Oct. 25, 1938 |
| 2,336,890 | Riegel et al. | Dec. 14, 1943 |

OTHER REFERENCES

Hilbert et al.: Journ. Amer. Chem. Soc., vol. 52, pp. 4489 to 4494 (Nov. 1930).

Schmidt-Nickels et al.: Journ. Amer. Chem. Soc., vol. 52, pp. 4511 to 4516 (Nov. 1930).

Lyman: American Pharmacy, J. B. Lippincott Co., 1945, page 264.